US011533343B2

(12) United States Patent
Nelson et al.

(10) Patent No.: US 11,533,343 B2
(45) Date of Patent: Dec. 20, 2022

(54) PRIVATE CELLULAR NETWORK FOR SEAMLESS EXTENSION OF ACCESSIBILITY OF PBX DEVICES TO REMOTE DEVICES

(71) Applicant: Geoverse LLC, Bellevue, WA (US)

(72) Inventors: Roderick Nelson, Bellevue, WA (US); Daniel Person, Little Elm, TX (US); Jason V. Smith, Castle Rock, CO (US)

(73) Assignee: Geoverse LLC, Bellevue, WA (US)

( * ) Notice: Subject to any disclaimer, the term of this patent is extended or adjusted under 35 U.S.C. 154(b) by 0 days.

(21) Appl. No.: 17/408,228

(22) Filed: Aug. 20, 2021

(65) Prior Publication Data
US 2022/0109704 A1    Apr. 7, 2022

Related U.S. Application Data

(60) Provisional application No. 63/068,154, filed on Aug. 20, 2020.

(51) Int. Cl.
*H04L 65/1069* (2022.01)
*H04L 65/1096* (2022.01)
(Continued)

(52) U.S. Cl.
CPC ...... *H04L 65/1069* (2013.01); *H04L 65/1016* (2013.01); *H04L 65/1053* (2013.01); *H04L 65/1096* (2013.01)

(58) Field of Classification Search
None
See application file for complete search history.

(56) References Cited

U.S. PATENT DOCUMENTS 8,554,931 B1 * 10/2013 Vossoughian ......... H04L 65/612
379/142.05
8,693,651 B2 * 4/2014 Schneider ............. H04M 15/06
379/142.05

(Continued)

FOREIGN PATENT DOCUMENTS

WO    WO 2019/206295    10/2019
WO    WO 2022/040581    2/2022

OTHER PUBLICATIONS

PCT Application No. PCT/US20201/046986 International Search Report and Written Opinion dated Dec. 16, 2021.

*Primary Examiner* — Backhean Tiv
(74) *Attorney, Agent, or Firm* — Polsinelli LLP

(57) ABSTRACT

In one aspect, a network component associated with a private cellular network includes at least one memory having computer-readable instructions stored therein and one or more processors. The one or more processors are configured to execute the computer-readable instructions to receive, from a user equipment, a request to register with the private cellular network, the user equipment having a unique identifier; determine, at the network component or via cloud-based Evolved Packet Core (EPC) communicatively coupled to the network component, a home EPC associated with the user equipment using the unique identifier of the user equipment; and establish an IP Multimedia Service (IMS) Access Point Name (APN) connection between the user equipment and the home EPC associated with the user equipment, the IMS APN enabling a seamless connectivity of the user equipment to a terminal on a Private Branch Exchange (PBX) system using a native dialer of the user equipment.

18 Claims, 10 Drawing Sheets

(51) Int. Cl.
  *H04L 65/1053* (2022.01)
  *H04L 65/1016* (2022.01)

(56) References Cited

U.S. PATENT DOCUMENTS

| | | | | |
|---|---|---|---|---|
| 8,739,269 | B2* | 5/2014 | Dargis | H04L 63/08 |
| | | | | 709/224 |
| 9,706,045 | B2* | 7/2017 | Allen | H04M 7/123 |
| 9,769,855 | B2* | 9/2017 | Lubenski | H04W 76/12 |
| 10,178,541 | B2* | 1/2019 | Carbone | H04L 65/1063 |
| 10,827,415 | B2* | 11/2020 | Sanderson | H04L 12/6418 |
| 10,979,895 | B2* | 4/2021 | Southall | H04L 61/4588 |
| 11,190,981 | B1* | 11/2021 | Nelson | H04L 47/15 |
| 2003/0139180 | A1* | 7/2003 | McIntosh | H04W 12/069 |
| | | | | 455/555 |
| 2007/0143397 | A1* | 6/2007 | Guedalia | H04M 3/42331 |
| | | | | 709/203 |
| 2010/0037309 | A1* | 2/2010 | Dargis | H04L 63/164 |
| | | | | 726/13 |
| 2010/0085896 | A1* | 4/2010 | Hattori | H04L 45/04 |
| | | | | 370/254 |
| 2013/0021998 | A1* | 1/2013 | Shatsky | H04L 65/1069 |
| | | | | 370/329 |
| 2013/0039343 | A1* | 2/2013 | Hori | H04W 36/12 |
| | | | | 370/331 |
| 2013/0070667 | A1* | 3/2013 | Ku | H04L 43/0805 |
| | | | | 370/328 |
| 2013/0242903 | A1* | 9/2013 | Narkar | H04L 47/72 |
| | | | | 455/552.1 |
| 2014/0287760 | A1* | 9/2014 | Spinelli | H04W 92/02 |
| | | | | 455/437 |
| 2014/0301258 | A1* | 10/2014 | Belghoul | H04W 52/0209 |
| | | | | 370/311 |
| 2014/0341109 | A1* | 11/2014 | Cartmell | H04W 28/0263 |
| | | | | 370/328 |
| 2015/0056986 | A1* | 2/2015 | Kim | H04L 65/103 |
| | | | | 455/432.1 |
| 2015/0063221 | A1* | 3/2015 | Lubenski | H04W 88/182 |
| | | | | 370/329 |
| 2015/0098394 | A1* | 4/2015 | Corcoran | H04W 88/16 |
| | | | | 370/329 |
| 2015/0173111 | A1* | 6/2015 | Agarwal | H04W 8/04 |
| | | | | 370/329 |
| 2015/0282026 | A1* | 10/2015 | Gupta | H04B 7/0626 |
| | | | | 370/331 |
| 2015/0327207 | A1* | 11/2015 | Bharadwaj | H04L 65/4061 |
| | | | | 455/435.2 |
| 2016/0226922 | A1* | 8/2016 | Russell | H04L 65/1069 |
| 2017/0006034 | A1* | 1/2017 | Link, II | H04L 63/08 |
| 2018/0084594 | A1* | 3/2018 | Lubenski | H04W 88/182 |
| 2018/0248787 | A1* | 8/2018 | Rajagopal | H04L 45/70 |
| 2019/0013967 | A1* | 1/2019 | Ishii | H04L 12/4633 |
| 2019/0182720 | A1* | 6/2019 | Elia | H04W 76/50 |
| 2019/0313318 | A1* | 10/2019 | Pawar | H04W 88/16 |
| 2019/0387394 | A1* | 12/2019 | Chennupati | H04W 88/04 |
| 2021/0126979 | A1* | 4/2021 | Ngo | H04L 67/141 |
| 2021/0218780 | A1* | 7/2021 | Foti | H04L 61/301 |
| 2021/0227401 | A1* | 7/2021 | Merino Vazquez | H04W 24/08 |
| 2022/0046381 | A1* | 2/2022 | Ong | G08G 1/164 |

* cited by examiner

PRIVATE CELLULAR NETWORK FOR SEAMLESS EXTENSION OF ACCESSIBILITY OF PBX DEVICES TO REMOTE DEVICES

CROSS-REFERENCE TO RELATED APPLICATIONS

This application claims priority to U.S. Provisional Patent Application No. 63/068,154, filed on Aug. 20, 2020 and titled "PRIVATE CELLULAR NETWORK FOR SEAMLESS EXTENSION OF ACCESSIBILITY OF PBX DEVICES TO REMOTE DEVICES, the entire content of which is incorporated herein by reference.

BACKGROUND

Field of the Disclosure

The present disclosure relates to operation of a private cellular network and more specifically to interconnectivity of a private cellular network and a private branch exchange network of an organization in order to seamlessly extend accessibility of the private branch exchange network to the remote devices using a native dialer of the remote devices.

Description of the Related Art

A Private Branch Exchange (PBX) system provides a private telephone network connecting computers, laptops, desktop telephones, etc., within a company or organization. Users of the PBX phone system can communicate internally (within their company) and externally, using different communication channels such as Voice over IP (VoIP), ISDN, etc. A PBX also enables such organizations to have more phones than physical phone lines (PTSN). Additionally, a PBX system provides features like transfer calls, voicemail, call recording, interactive voice menus (IVRs) and call queues.

In addition to having PBX connected devices, users (e.g., employees) within an organization using a PBX system also have personal and/or organization-issued wireless enabled devices such as mobile phones, tablets, etc. (external devices). Due to mobility of users, maintaining a constant connection and access to their respective PBX devices (e.g., their desktop telephones) and/or connection to other PBX connected devices in their organization (as if a user is actually in his or her office with access to their respective PBX connected device) is a challenge.

Current solutions for maintaining remote connectivity and access to PBX devices are not seamless and require reconfiguring the external devices to allow for such access, where such reconfiguring includes the requirement of having to download an application (e.g., a VoIP application) on the external devices to allow access to PBX devices on the external devices.

SUMMARY

One or more example embodiments of inventive concepts are directed to enabling endpoint devices with cellular connectivity that are connected to a private cellular network, use their native dialer to connect to endpoints on a Private Branch Exchange (PBX) system (PBX devices) without having to reconfigure or download software/applications on the end devices. This connectivity enables corresponding users of such endpoint devices to have a seamless connection and access to their corresponding PBX device and/or other services and PBX devices on the PBX system, transforming each such endpoint device to function as a remote PBX device on the PBX network/system. Additionally and as will be described in more detail below, the connectivity between endpoint devices connected to a private cellular network and their respective PBX system will be through an IP Multimedia System (IMS) Access Point Name (APN) configuration, which results in the exchanged data and network traffic to receive a higher quality of service compared to other types of network traffic such as data APN.

In one aspect, a router associated with a private cellular network includes at least one memory having computer-readable instructions stored therein and one or more processors. The one or more processors are configured to execute the computer-readable instructions to receive, from a user equipment, a request to register with the private cellular network, the user equipment having a unique identifier; determine, at the router or via cloud-based Evolved Packet Core (EPC) communicatively coupled to the router, a home EPC associated with the user equipment using the unique identifier of the user equipment; and establish an IP Multimedia Service (IMS) Access Point Name (APN) connection between the user equipment and the home EPC associated with the user equipment, the IMS APN enabling a seamless connectivity of the user equipment to a terminal on a Private Branch Exchange (PBX) system using a native dialer of the user equipment.

In another aspect, the user equipment does not have an application installed thereon and configured for facilitating connections to the PBX system.

In another aspect, a command provided on the user equipment for connecting to the terminal on the PBX system is the same as a command to be provided on a PBX device within the PBX system for establishing a connection to the terminal.

In another aspect, the connection request is one of a request to establish a voice communication with the terminal on the PBX system, a request to access a voicemail on the terminal on the PBX system, a request for establishing a multimedia session with the terminal on the PBX system, or a request from a PBX device for communicating with the user equipment.

In another aspect, a PBX server of the PBX system is communicatively coupled to the home EPC of the user equipment.

In another aspect, the router is configured to identify an edge EPC that is local to the router and communicatively coupled thereto, as the home EPC of the user equipment, if the unique identifier of the user equipment is available at a local routing table of the router.

In another aspect, when the router determines that the unique identifier of the user equipment is not available in the local routing table of the router, the router is configured to send a message to the cloud EPC requesting identification of the home EPC of user equipment.

In another aspect, the home EPC identified by the cloud EPC is not at the same physical location as the router.

In another aspect, the cloud EPC identifies the home EPC using the unique identifier of the user equipment and a corresponding routing table available at the cloud EPC.

In another aspect, the user equipment and the terminal on the PBX system are associated with the same user.

In one aspect, a system for a private cellular network includes a cloud-based evolved packet core (EPC); and a router communicatively coupled to the cloud-based EPC. The router includes at least one memory having computer-readable instructions stored therein and one or more processors configured to execute the computer-readable instructions to receive, from a user equipment, a request to register with the private cellular network, the user equipment having a unique identifier; determine, at the router or via the cloud-based EPC, a home EPC associated with the user equipment using the unique identifier of the user equipment; and establish an IP Multimedia Service (IMS) Access Point Name (APN) connection between the user equipment and the home EPC associated with the user equipment, the IMS APN enabling a seamless connectivity of the user equipment to a terminal on a Private Branch Exchange (PBX) system using a native dialer of the user equipment.

In another aspect, the user equipment does not have an application installed thereon and configured for facilitating connections to the PBX system.

In another aspect, a command provided on the user equipment for connecting to the terminal on the PBX system is the same as a command to be provided on a PBX device within the PBX system for establishing a connection to the terminal.

In another aspect, the connection request is a request to establish a voice communication with the terminal on the PBX system or a request from a PBX device for communicating with the user equipment.

In another aspect, the connection request is a request to access a voicemail on the home EPC of the user equipment.

In another aspect, the router is configured to identify an edge EPC that is local to the router and communicatively coupled thereto, as the home EPC of the user equipment, if the unique identifier of the user equipment is available at a local routing table of the router.

In another aspect, when the router determines that the unique identifier of the user equipment is not available in the local routing table of the router, the router is configured to send a message to the cloud EPC requesting identification of the home EPC of user equipment.

In another aspect, the home EPC identified by the cloud EPC is not at the same physical location as the router.

In another aspect, the cloud EPC identifies the home EPC using the unique identifier of the user equipment and a corresponding routing table available at the cloud EPC.

In another aspect, the user equipment has a SIM card registered with the private cellular network.

In one aspect, a method includes receiving, from a user equipment, a request to register with a network, the user equipment having a unique identifier; determining, at the network or via cloud-based proxy communicatively coupled to the network, a home EPC associated with the user equipment using the unique identifier of the user equipment; and establishing an IP Multimedia Service (IMS) Access Point Name (APN) connection between the user equipment and the home EPC associated with the user equipment, the IMS APN enabling a seamless connectivity of the user equipment to a terminal on a Private Branch Exchange (PBX) system using a native dialer of the user equipment.

In one aspect, an apparatus is provided. The apparatus includes means for receiving, from a user equipment, a request to register with a network, the user equipment having a unique identifier; means for determining, at the network or via cloud-based proxy communicatively coupled to the network, a home EPC associated with the user equipment using the unique identifier of the user equipment; and means for establishing an IP Multimedia Service (IMS) Access Point Name (APN) connection between the user equipment and the home EPC associated with the user equipment, the IMS APN enabling a seamless connectivity of the user equipment to a terminal on a Private Branch Exchange (PBX) system using a native dialer of the user equipment.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
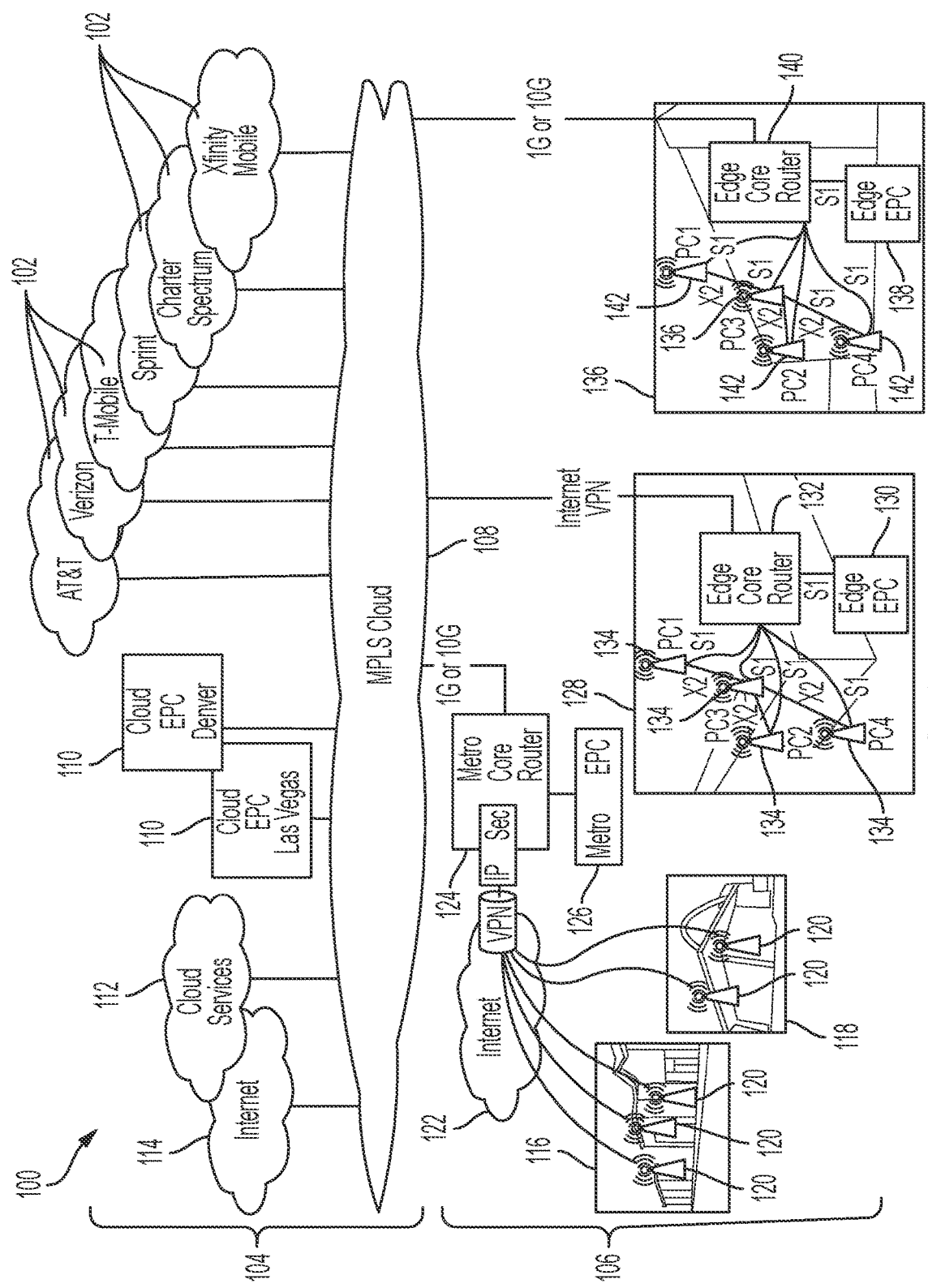
FIG. 1 illustrates an overview of a private cellular network ecosystem, according to an aspect of the present disclosure.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

Many organizations use a Private Branch Exchange (PBX) system (an IP based network) to facilitate an in-network connectivity between members of the organization using PBX connected devices such as desktop telephones, computers, laptops, tablets, etc. (hereinafter, PBX devices). At any given point in time, due to mobility, a member may not be in his or her office or otherwise may not be able to readily access their corresponding PBX device. As noted above, remote accessibility to PBX devices, using personal devices such as a mobile telephone or tablet (hereinafter, remote devices), requires reconfiguration of such remote devices. A typical reconfiguration requires a user to download an application (e.g., a VoIP application) on the remote device that once executed, essentially converts the remote device into a PBX device that allows the corresponding user to access content (e.g., voicemail, etc.) on their respective PBX device, connect to PBX devices of their colleagues and other members in the organization, etc.

As will be described below, the present disclosure provides an improvement to this approach by eliminating the need for reconfiguration of a remote device (downloading an application) for connectivity and access to PBX devices, when the remote device is operating on a private cellular network that is connected to the appropriate PBX system. Eliminating the need for the reconfiguration/downloading an application, allows the use of a native dialer on the remote device to connect to and access PBX devices. Additionally and as will be described in more detail below, the connectivity between endpoint devices connected to a private cellular network and their respective PBX system will be through an IP Multimedia System (IMS) Access Point Name (APN), which results in the exchanged data and network traffic to receive a higher quality of service compared to other types of network traffic such as data APN.

Hereinafter, the terms PBX system, enterprise PBX and PBX network may be used interchangeably. The disclosure begins with an overview of a private cellular network.

A private cellular network within the context of the present disclosure is an ecosystem comprised of a backend component (a cloud component) and a site component. A site component may be comprised of specially configured hardware components installed at a site to provide cellular network (voice and data) connectivity to endpoints connected thereto.

A site component can be comprised of a number (e.g., ranging from single digit numbers to hundreds or thousands) of radio access components (e.g., small cell radio components that provide network connectivity such as LTE small cells, 5G access nodes, etc.) that are deployed over a limited geographical area (e.g., a building, a factory floor, a neighborhood, a shopping mall, etc.) and operate over a spectrum available for private use. The site component further includes known or to be developed radio equipment such as routers and core network components (Evolved Packet Core (EPC) components). EPC components can be 4G/LTE EPC components and/or 5G EPC components/functionalities.

For example, 4G/LTE EPC components include, but are not limited to, a Serving GPRS Support Node (SGSN), Gateway GPRS Support Node (GPRS) Mobile Switching Center (MSC), a Mobility Management Entity (MME), Home Subscriber Server (HSS), a Serving Gateway (S-GW), a Packet Data Network Gateway (PDN-GW), a Policy & Charging Rules Function (PCRF).

In another example, 5G EPC components include, but are not limited to, a Authentication Server Function (AUSF), a Core Access and Mobility Management Function (AMF), a Data network (DN), a Structured Data Storage network function (SDSF), an Unstructured Data Storage network function (UDSF), a Network Exposure Function (NEF), a NF Repository Function (NRF), a Policy Control function (PCF), a Session Management Function (SMF), a Unified Data Management (UDM), a User plane Function (UPF), an Application Function (AF), etc. Components of a 5G core can be referred to as functionalities as most are software based and can be adapted according to need and use case.

The site component can also include IP Multimedia Subsystem (IMS) for delivering IP multimedia services such as Voice over LTE (Vo-LTE) through IMS core. IMS core can handle IMS functionalities including, but not limited to, subscriber management, session setup and policy and charging enforcement, maintaining Quality of Service (QoS) and seamless interfacing between IMS Application Servers and the EPC.

The backend (cloud) component may provide one or more EPC functionalities (e.g., HSS services), manage interfacing and communication of the private cellular network with MNOs, allow mobility among users of the private cellular network by enabling them to move between multiple site components and still access their home site component, etc. Services provided by the backend component may be shared by/segmented for use by multiple private cellular networks that function independently as they may have been deployed at different sites and operated by different/independent enterprises. Additionally, the backend component may include networking and management tools (Network as a Service (NaaS)) built and deployed over network components (e.g., NaaS developed by Geoverse LLC of Seattle, Wash.) that are trusted by operators of the private cellular networks and various mobile network operators (MNOs) that, as will be described below, have suboptimal coverage in these confined geographical locations and thus have their endpoints and subscribers roam on such private cellular networks.

Such ecosystems, as described above, offer a fully interconnected private cellular network with a number of significant advantages to enterprises and MNOs. These ecosystems are flexible and scalable and eliminate costs and complexities associated with enterprises having to develop their own private network capabilities and/or costs and complexities associated with MNOs having to expand their network infrastructure and services to provide cellular connectivity to their subscribers and endpoints.

A fully integrated ecosystem described above provides premium connectivity services to both home and guest (roaming) devices coupled with various analytical features such as end user experience, service usages, indoor location determination and indoor mapping as well as capacity monetization including, but not limited to, potential sale of excess capacity to mobile operators and others.

Premium connectivity services include, but are not limited to, Subscriber Identity Module (SIM) subscriptions, shared data bundles, private cellular (LTE) voice, edge computing capabilities, etc. home and guest (roaming) devices include, but are not limited to, bridges, gateways, modems, push-to-talk devices, smartphones, tablets, laptops, Internet of Things (IoT) devices such as facility management devices, HVAC control devices, security monitoring devices, point of sale devices, sensors for maintenance, asset tracking, etc., robotics and autonomous vehicles, etc.

Cellular connectivity and services may be provided to guest devices by the private cellular network where the cellular connectivity services of the devices' home networks may be sub-optimal/less than a threshold level of service. Such threshold level of service may be a configurable parameter determined based on experiments and/or empirical studies. For example, when cellular data services offered by a home network is less than a threshold download/upload speed (in mbps) or such services of slower than same services provided by private cellular network by more than a threshold percentage (e.g., slower by more than 5%, 10%, 20%, etc.), private cellular network may be utilized to provide better cellular voice and data services to end users and thus improve end user experience. In addition to download/upload speed, other examples of such thresholds include signal strength (received signal strength indicator), signal quality measurement(s), etc.

FIG. 1 illustrates an overview of a private cellular network ecosystem, according to an aspect of the present disclosure. In ecosystem 100, one or more Mobile Network Operators (MNOs) 102 may interface with private cellular network of the present disclosure, which is comprised of a cloud based backend component 104 and site component 106.

MNOs 102 may include, but are not limited to, known operators of cellular networks such as AT&T®, Verizon®, T-Mobile®, Sprint®, Charter Spectrum®, Xfinity Mobile®, Vodafone® and/or any other known or to be established MNO. In one example, MNOs 102 may have a number of subscribers that may visit site component 106, in which the corresponding MNO(s) may not have sufficient wireless coverage and services available to their subscribers. As will be described below, these subscribers may roam on private cellular network at site component 106 when a roaming agreement is in place and is active between provider of the private cellular network at a site and roaming subscribers' respective MNOs.

Use of the private cellular network described in the present application is not limited to MNO subscribers with home MNOs having an active roaming arrangement in place with the provider of the private cellular network. For example, the private cellular network may be accessed by any mobile device having a dual-SIM capabilities with one SIM card being registered with their home MNO (cellular service provider) and another SIM card registered with the private cellular network. Another example use of private cellular network may be as part of a Multi-Operator Core Network (MOCN) structure, where one or more MNOs and private cellular network of the present disclosure may share the network infrastructure (e.g., edge or metro core router, as will be described below) of the private cellular network for servicing their subscribers.

Backend component 104 may include, but is not limited to, Multi-Protocol Label Switching (MPLS) cloud 108 on which one or more EPCs 110 of the private cellular network (e.g., located in different physical locations/cities) are accessible. Various known, or to be developed, cloud services 112 as well as the Internet 114 are also accessible via cloud 108.

Site component 106 of FIG. 1 includes two non-limiting examples of a metro site and an edge site. As noted above, a site component may include specially configured hardware components that provide network connectivity (cellular voice and data) to connected endpoints.

A metro site component may be deployed in a metropolitan area such that the private cellular network can encompass several/independent confined geographical areas such as a shopping mall comprised of multiple independent stores and locations, one or more blocks of a city, an entire university campus, etc. In FIG. 1, an example metro site is comprised of sites 116 and 118. Example site 116 can be an open air strip mall while example site 118 can be a closed building such as shopping mall. Access points 120 may be installed throughout sites 116 and 118 and communicate via Internet 122 (e.g., over known or to be developed Virtual Private Network (VPN) and IP security (IPSec) connections and protocols) with a private cellular edge formed of a metro core router 124 and a metro EPC 126. Metro core router 124 may be connected to MPLS cloud 108 and cloud backend component 104 via any known or to be developed wired and/or wireless connection (e.g., a 1G or a 10G connection).

An edge site component may be deployed in a single location providing cellular connectivity to users of and roamers associated with a single entity (e.g., a single corporation or business entity) and covers a confined geographical area that is smaller and more limited compared to a metro site. Another distinction between an edge site component and a metro site component is that each edge site is equipped with a dedicated edge core router and edge EPC (serving a single entity or enterprise network of a corporation, etc.) while several components of a metro site component may be shared by connected endpoints of several different entities as they share the same metro core router and metro EPC as described above.

Example edge sites component 128 of FIG. 1 may be at a factory site with a dedicated edge core router 130 and a dedicated edge EPC 132. Edge site component 128 may also have one or more access points 134 installed throughout the site and communicatively connected to edge core router 130 and edge EPC 132.

Example edge site component 136 may be a building with a dedicated edge core router 138 and a dedicated edge EPC 140. Edge site component 136 may also have one or more access points 142 installed throughout the site and communicatively connected to edge core router 138 and edge EPC 140.

Each of edge core routers 130 and 138 may be communicatively connected to MPLS cloud 108 and cloud backend component 104 via known or to be developed connections such as a VPN connection, a wired 1G/10G connection, etc.

Edge core routers 130, 138 a metro core router 124 may also be referred to as proxy routers.

Figure 2:
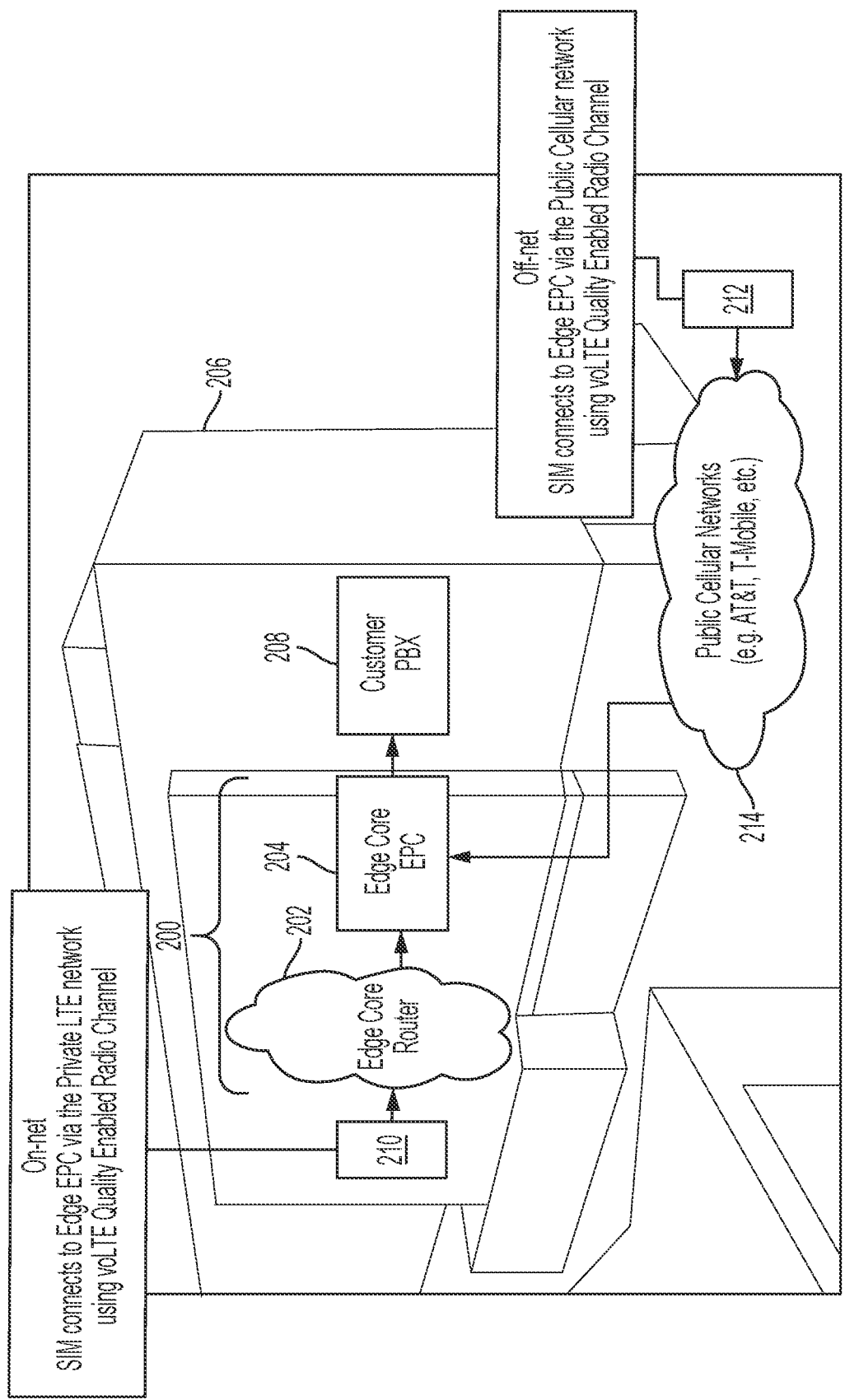
FIG. 2 illustrates an overview of an edge site component of a private cellular network deployed at an edge site, according to an aspect of the present disclosure.

FIG. 2 illustrates an overview of an edge site component of a private cellular network deployed at an edge site, according to an aspect of the present disclosure. Edge site component 200 of FIG. 2 may be the same as edge site component 136 of FIG. 1 with a dedicated edge core router 202 and a dedicated edge EPC 204 that may be the same as dedicated edge core router 138 and edge EPC 140, respectively. An enterprise network may be deployed in a building (edge site/customer site) 206 or a portion thereof occupied by an organization, entity, etc., Such enterprise network may be coupled to edge site component 200 so that edge site component 200 can provide private cellular network connectivity to endpoint devices of the enterprise network and/or any one or more external devices (not registered or part of enterprise network) present at edge site 206 and for which their corresponding MNO has an agreement in place with operator of edge site component 200 or otherwise is considered a valid UE/data source as described above and will be described further below.

The enterprise network may have one or more enterprise specific endpoints such as Private Branch Exchange (PBX) devices 208. PBX devices 208 may form a private telephone network of an organization associated with the enterprise network at edge site 200. Other examples of enterprise specific endpoints include, but are not limited to, mobile device 210, one or IoT devices (not shown), tablets, laptops, desktops, switches, routers, etc. (not show).

In example of FIG. 2, mobile device 210 may be a device registered with the enterprise network and the private cellular network provider. Accordingly, mobile device 210 may be provided with a SIM card registered with the private cellular network provided via edge site component 200. Mobile device 210 may be referred to as home mobile device 210 for which the private cellular network deployed at edge site 200 serves as the primary cellular service provider. Accordingly, mobile device 210 may connect to edge core router 202 and subsequently to the rest of the private cellular network to receive voice (e.g., LTE/5G quality voice (VoLTE)) and cellular data services. Furthermore, any one or more roaming/guest devices may roam on the private cellular network provided via edge site component 200, as will be described above. Such roaming/guest devices may not have a SIM card registered with private cellular network provided by edge site component 200 and instead may be registered with one or more of MNOs described above with reference to FIG. 1, serving as corresponding home cellular network providers of the roaming/guest devices.

Also, shown in FIG. 2 is an example of another home mobile device 212 that is registered with the private cellular network deployed via edge site component 200. However, mobile device 212 may be located outside building/site 206 such that mobile device 212 no longer falls within footprint/coverage area of the deployed private cellular network. Mobile device 212 can fall within the footprint of a cellular base 214 (e.g., LTE base station, eNode-B, etc.) of an MNO, examples of which are described above with reference to FIG. 1. Mobile device 212 can then connect to cellular base 214 and to edge EPC 204 to receive cellular voice and data services.

Figure 3:
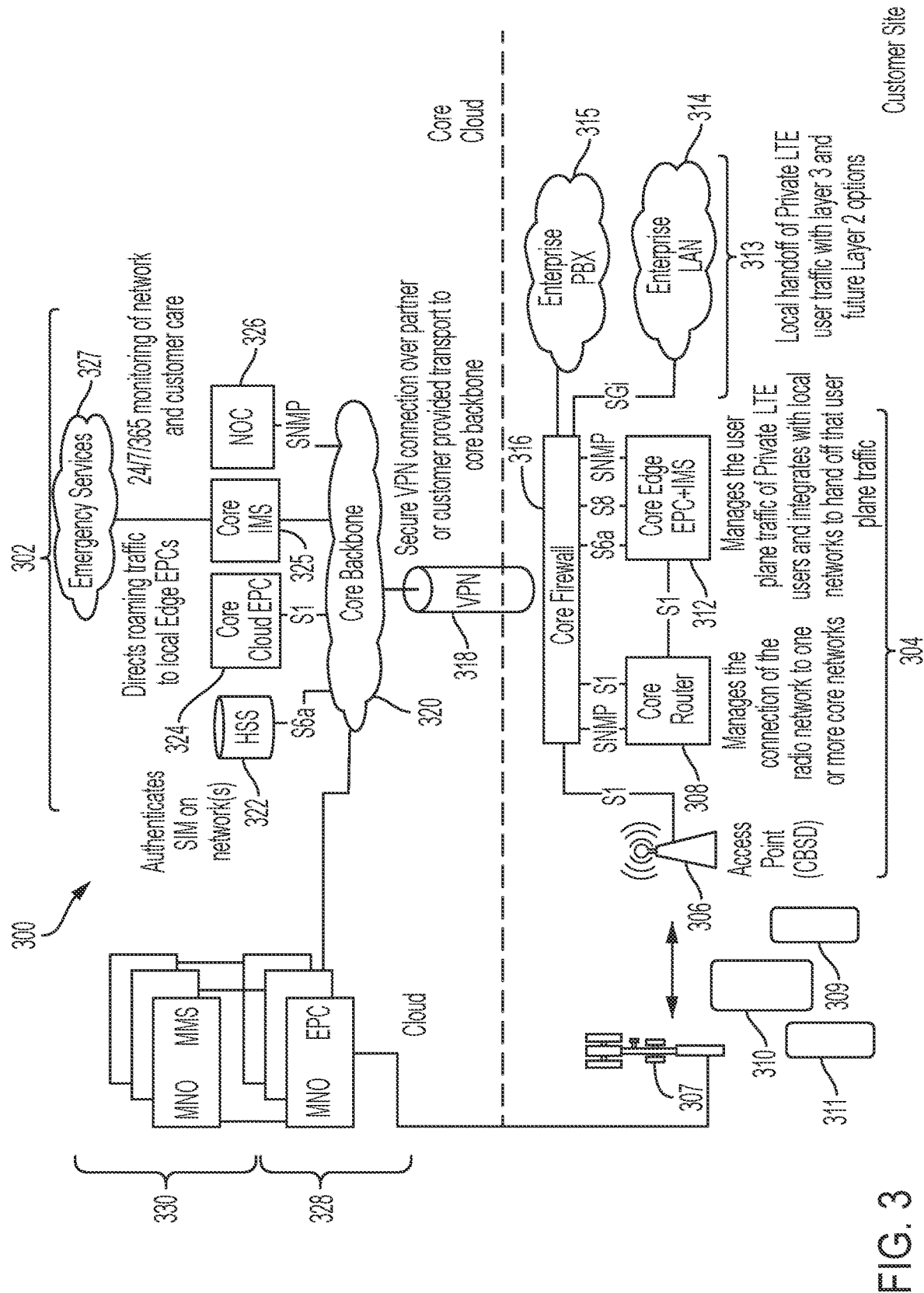
FIG. 3 illustrates details of cloud and site components of ecosystem of a private cellular network, according to an aspect of the present disclosure.

FIG. 3 illustrates details of cloud and site components of ecosystem of a private cellular network, according to an aspect of the present disclosure. As described above with reference to FIGS. 1 and 2 as well, ecosystem 300 is comprised of backend component 302 and site component 304, which may be the same as backend component 104 and site component 106 of FIG. 1, respectively. Backend component (cloud component) 302 and site component 304 may form a private cellular network configured to provide cellular voice and data services to one or more home devices of an enterprise network (at a customer site) that is communicatively coupled to site component 304.

In addition to backend component 302 and site component 304, FIG. 3 also illustrates, in general, components of MNOs and an example enterprise network communicatively coupled to cloud component 302 and site component 304, respectively, and will be further described below.

Site component 304 may have one or more access points 306 (e.g., a Citizens Broadband Radio Service (CBRS) access point) coupled to an edge core router 308, all of which may be deployed at a customer site, which can be the same as edge site 206 of FIG. 2.

Edge core router 308, as will be described below, is a specially configured router for managing network traffic (inbound and outbound) to and from connected endpoints such as endpoints 309, 310 and 311 (each of which may also be referred to as a user equipment (UE)). A number of UEs connected to private cellular network at the customer site is not limited to 3 and can be more or less.

UEs 309, 310 and 311 can be any one of, but not limited to, a mobile device, a tablet, a laptop, an Internet of Things (IoT), a sensor, etc. In other words, UEs 309, 310 and 311 can be any device capable of establishing a wireless/cellular connection to nearby device.

As will be further described below, any number of UEs may be registered with enterprise network 313. Furthermore, one or more of UEs 309, 310 and 311 may be roaming devices that are not registered with enterprise network 313 but instead are associated with MNOs that have roaming agreements in place with provider of private cellular network at the customer site and hence are allowed to roam on the private cellular network.

One or more of UEs 309, 310 or 311 may also be a dual-SIM device registered with both a home MNO and private cellular network without the MNO necessarily having a roaming arrangement in place with the private cellular network. In another example, any one or more of UEs 309, 310 or 311 may be a subscriber of an MNO being part of a MOCN with private cellular network of the present disclosure. All such UEs may be considered valid UEs (which may also be referred to as a valid source of a data packet) that may access private cellular network of the present disclosure and have core router of the private cellular network service (route) their respective inbound/outbound voice and data traffic.

Accordingly and while example embodiments are primarily described with reference to a roaming UE with a home MNO that has an active roaming agreement in place with the provider of private cellular network of the present application, as an example of a valid UE, the present disclosure is not limited thereto. A valid UE may also be a dual-SIM UE or a UE of a subscriber with an MNO that is part of a MOCN with the private cellular network. Similarly, the present disclosure may frequently refer to services provided by the private cellular network and edge core router 308 to a valid UE as roaming services. Such services are not limited to roaming services commonly referred to in the relevant art but may also include secondary/auxiliary LTE services. Accordingly, services provided by private cellular network of the present disclosure may be referred to as complimentary (and/or secondary or auxiliary) cellular services.

Edge core router 308 may be coupled to edge EPC 312 (e.g., using a S1 LTE connection shown in FIG. 3). In example of FIG. 3, edge EPC 312 also provides IMS services described above. Edge EPC 312 may be configured to manage user plane traffic of private cellular users (e.g., user equipment and connected endpoints of enterprise network 313 for which the private cellular network serves as a home cellular service provider). Edge EPC 312 may interface with enterprise Local Area Network (LAN) 314 to handoff user plane traffic to enterprise network 313 (with layer 3/layer 2 option). An example connection between edge EPC 312 and enterprise network 313 may be via a SGi interface/connection as shown in FIG. 3. Enterprise network 313 may include enterprise equipment and devices such as enterprise PBX 315 and enterprise LAN 314 described above.

Site component 304 may further include a firewall 316 that interfaces with access point 306, edge core 308, edge EPC 312, with access point 306 and components of enterprise network 313. As shown in FIG. 3, firewall 316 may interface with access point 306 using a dedicated S1 interface. Firewall 316 may interface with edge core router 308 using another dedicated S1 connection and Simple Network Management Protocol (SNMP) protocol. Firewall 316 may interface with edge EPC 312 using S6a and S8 connections and Simple Network Management Protocol (SNMP). Furthermore, firewall 316 may be connected to enterprise LAN 314 using a SGi connection.

Backend component 302 may be communicatively connected to site component 304 via any known or to be developed secure communication medium such as a secure VPN connection 318.

Backend component 302 may include a backbone 320 and communicatively coupled to one or more cloud based servers (may be geographically distributed) and may be proprietary or provided via third party providers of private/public/hybrid cloud infrastructure. Any one or more of such cloud based servers may be a HSS server 322 configured to authenticate SIM cards associated with the private cellular network (e.g., a SIM card activate in UE 310) and/or a SIM card of an MNO with an associated UE roaming on the private cellular network at the customer site shown in FIG. 3 and similarly described in FIG. 2. Another one of such servers may be a core cloud EPC 324 (or simply cloud EPC 324). Cloud EPC 324 may function to direct home traffic originating from one site component such as site component 304 to another site component of the same private cellular network. For example, an organization may have offices in multiple cities, all of which may be operating on enterprise network 313. Site component 304 of the private cellular network may be deployed at each one of the multiple offices. Accordingly, local cellular traffic from one site component 304 at one of the offices may be directed to the private cellular network deployed at another office via cloud EPC 324. Cloud EPC 324 may provide an additional functionality referred to as GPRS Tunneling Protocol Proxy (GTP Proxy), which as will be described below, may be used to determine the correct home edge EPC of a connected device to enable the use of the native dialer of the connected endpoint to access its local enterprise PBX. Alternatively, GTP proxy may be a standalone server at backend component 302.

Backend component 302 may also include an IP Multimedia Service (IMS) 325 for communicating/processing requests for IMS services to appropriate IMS processing components of home networks. IMS 325 may also process/forward requests for emergency services (e.g., 911 services) to appropriate providers of such services such as emergency services 327.

Backend component 302 may further include an additional server 326 that may be referred to as Network Operation Center (NOC) 326 configured to manage operation of the private cellular network ecosystem and provide NaaS services described above and services such as network monitoring, customer service, etc.

Backbone 320 may be communicatively coupled to HSS 322 using a S6a connection, to cloud EPC 324 using an S1 interface, to IMS 325 via any known or to be developed communication scheme/protocol and to NOC 326 using an SNMP protocol.

As also shown in FIG. 3, backbone 320 may be connected/communicatively coupled to multiple MNOs. FIG. 3 illustrates an example of three different MNOs, each of which has a corresponding MNO EPC from among the three examples of MNO EPCs 328. Each MNO EPC from MNO EPCs 328 may optionally have a corresponding MNO IMS from among MNO IMSs 330 shown in FIG. 3. Alternatively, multiple MNO EPCs 328 may share a common MNO IMS 330. A combination of one MNO EPC 328 and one MNO IMS 330 may be referred to as an MNO.

Furthermore, each MNO EPC 328 may be communicatively coupled to a cell tower such as cell tower 307. While FIG. 3 illustrates a single cell tower 307, each MNO may have a separate cell tower similar to cell tower 307 to which it is communicatively coupled. In the non-limiting example of FIG. 3, a single tower 307 may be shared by all MNOs formed by MNO EPCs 328 and MNO IMSs 330.

Cell tower 307 is intended to provide cellular and voice data coverage to one or more subscribers such as UEs 309, 310 and/or 311. However, for various reasons, such coverage may be limited or unavailable to UEs 309, 310 and/or 311. For example, coverage of a given MNO may be weak or otherwise not allowed inside the geographical location (customer site) in which the enterprise LAN 314 and the private cellular network is deployed, hence a corresponding one of UEs 309, 310 or 311 may be operating as a guest device on the private cellular network.

A given MNO comprised of one of MNO EPCs 328 and optionally one of MNO IMSs 330 may operate as home network of one or more UEs (e.g., UEs 309, 310 and 310) roaming on the private cellular network provided by backend component 302 and site component 304 at the customer site (e.g., because coverage of the home network within the site in which the private cellular network is deployed, may be suboptimal (less than a threshold coverage)). Connection between backbone 320 and MNO networks 328 may be via any known or to be developed communication link such as roaming links (S8 interface) and IPX connections.

With examples of a private cellular network described above with reference to FIGS. 1-3, the disclosure now turns to description of using the private cellular network to enable mobile devices connected to the private cellular network use a native dialer of the mobile devices to connect to and access PBX devices at customer PBX 208 and enterprise PBX 315 of FIGS. 2 and 3.

Figure 4:
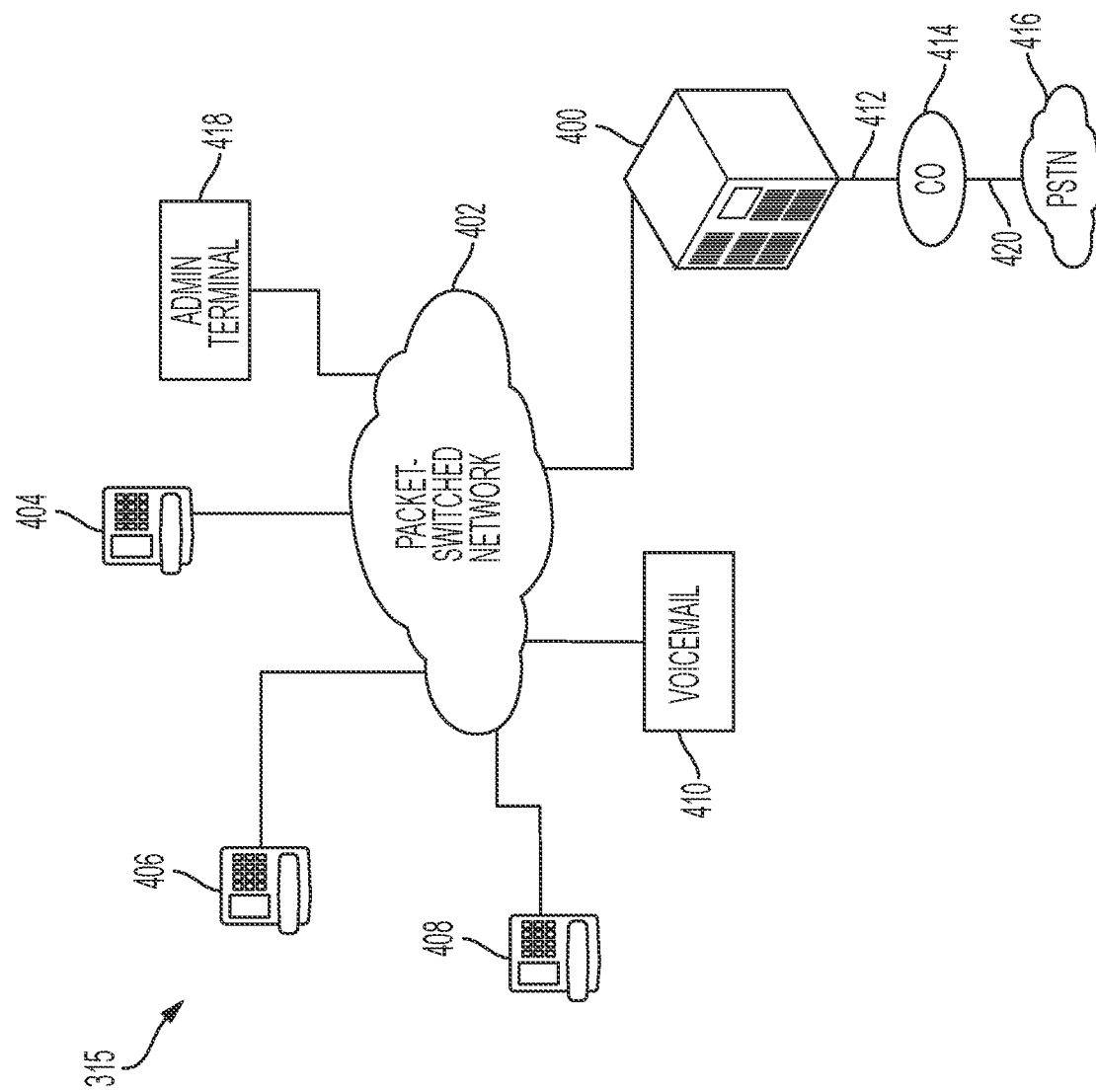
FIG. 4 illustrates an example PBX system, according to an aspect of the present disclosure.

FIG. 4 illustrates an example PBX system, according to an aspect of the present disclosure. FIG. 4 illustrates an example of enterprise PBX 315 of FIG. 3 (equally applicable to customer PBX 208 of FIG. 2 as well). As shown FIG. 4, an IP PBX system includes, at its core, an IP PBX server 400, such as one manufactured by Avaya Inc. (e.g., the "Communications Manager" platform), Cisco Systems, Inc. (e.g., the "Avid" platform), Nortel Networks, Ltd. (e.g., the "MCS" platform), or 3Com Corporation (e.g., the "NBX" platform), for instance. IP PBX server 400 may be a node on a packet-switched network 402, which may include an enterprise local area network (LAN) such as enterprise LAN 314 of FIG. 3.

Communicatively linked with packet-switched network 402 are multiple end-user telephone stations, represented in FIG. 4 by devices 404, 406 and 408. Devices 404, 406 and 408 may be referred to as PBX devices and/or enterprise devices. Number of PBX devices in enterprise PBX 315 is not limited to three shown in FIG. 4 and can be more or less (e.g., in the order of tens, hundreds or thousands of devices).

Each of PBX devices 404, 406 and 408 may have an extension defined by IP PBX server 400. Furthermore, each of PBX devices 404, 406 and 408 may be a voice over IP (VoIP) telephony device (such as an IP telephone, IP fax machine, multi-media computer, media terminal adapter, analog terminal adapter, or other device) that is capable of engaging in packetized bearer and signaling communication with IP PBX server 400 to communicate real time media such as voice, video or audio, or other data or information (e.g., fax or modem data). Also linked with the packet-switched network is an enterprise voice mail server 410. Enterprise voice mail server 410 may be integrated as a function in IP PBX server 400 or, as shown, may exist as a separate component.

IP PBX server 400 may be coupled to one or more T1 lines, PRI lines, or other high capacity circuit link 412 with a local telephone company central office (CO) 414, which provides connectivity to Public Switched Telephone Network (PSTN) 416. In one example, link 420 between IP PBX server 400 and CO 414 may carry multiple subscriber (local loop) telephone lines, each providing a direct dial line for the enterprise. Through link 420 and the IP PBX server 400, PBX devices 404, 406 and/or 408 can place and receive calls over PSTN 416.

IP PBX server 400 normally includes or has access to configuration data (not shown) for each of PBX devices (such as PBX devices 404, 406 and 408) served by IP PBX server 400. For each station, the configuration data defines a PBX extension and other service parameters and preferences, such as preferences to have unanswered calls forwarded to enterprise voice mail server 410, and the like. Further, the configuration data may correlate Direct Inward Dial (DID) numbers with certain stations, so as to allow PSTN calls to be placed directly to those stations (rather than being placed to a main IP PBX number and from there being transferred to the stations).

One or more computer terminals sitting on network 402 or coupled directly with IP PBX server 400 may be used to provision the configuration data for the various telephone stations. For instance, an administrator terminal 418 may run a provisioning program or provide access to a web-based provisioning program, through which an administrator can set up and manage IP PBX configuration parameters for the various telephone stations.

In practice, PBX NBX will engage in signaling communication with IP PBX server 400 using a proprietary or standard signaling protocol to set up and manage calls. By way of example, suitable protocols include, but are not limited to, H.323 and Session Initiation Protocol (SIP), etc. Using SIP, for instance, PBX device 404 can send an IP-based SIP "INVITE" message to IP PBX server 400, in an effort to set up a call to another extension on IP PBX server 400 or a call to an outside telephone number.

If the call is an inside call, IP PBX server 400 may then send a SIP INVITE in turn to the called device (another PBX device such as PBX device 406), to cause PBX device 406 to ring. When PBX device 406 answers, PBX device 406 may respond to IP PBX server 400 with a SIP "200 OK" message, and IP PBX server 400 may in turn respond to PBX device 406 with a SIP 200 OK message. After further SIP signaling, a VoIP (e.g., Real-time Transport Protocol) voice session can be set up between PBX device 404 and PBX device 406, so that users of PBX device 404 and PBX device 406 can communicate with each other. If the call is an outside call, on the other hand, IP PBX server 400 may forward (or allow pass-through of) the digits dialed by PBX device 404, via link 412, to CO 414, and CO 414 may set up the call over PSTN 416 to the called party.

With examples of a private cellular network and an PBX system described with reference to FIGS. 1-4, the disclosure now turns to an example method of interconnecting edge core of a private cellular network and a PBX system to allow remote devices connected to the private cellular network access to their respective devices and/or communicate with other devices on the PBX system using native dialer of such remote devices.

Figure 5A:
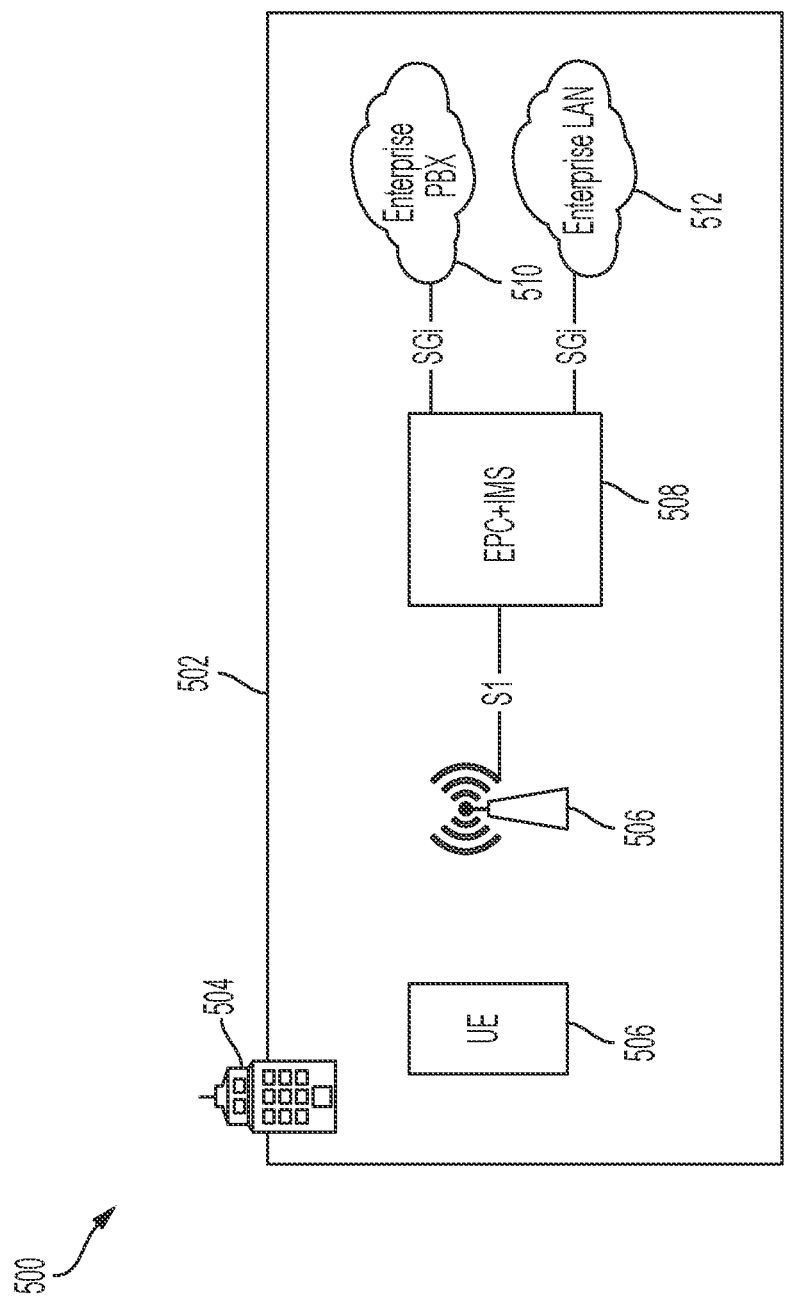
FIG. 5A illustrates an example configuration of a self-contained edge private cellular network integrated with a PBX system, according to an aspect of the present disclosure.
Figure 5B:
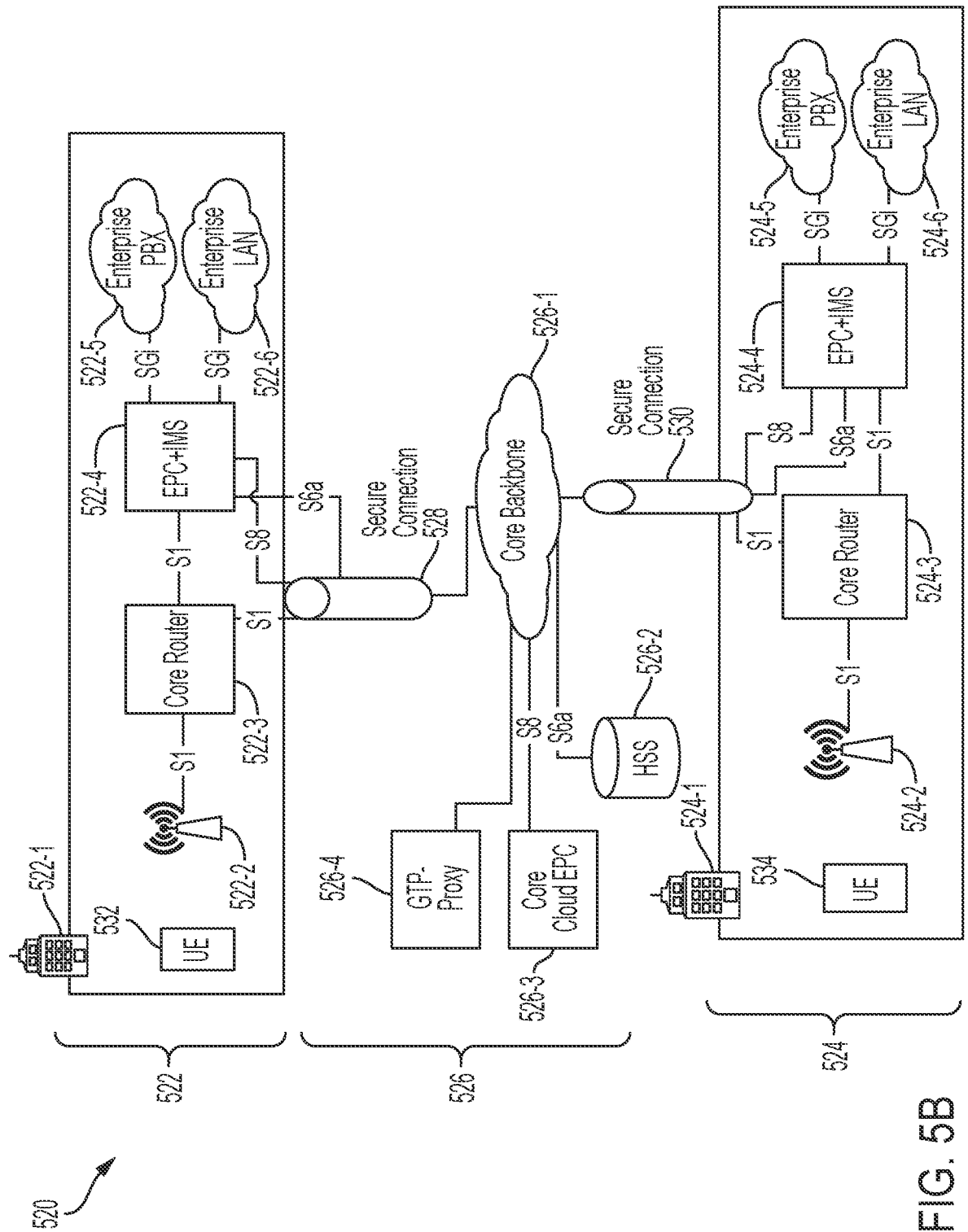
FIG. 5B illustrates an example configuration of multiple private cellular networks and their respective PBX system integration, according to an aspect of the present disclosure.
Figure 5C:
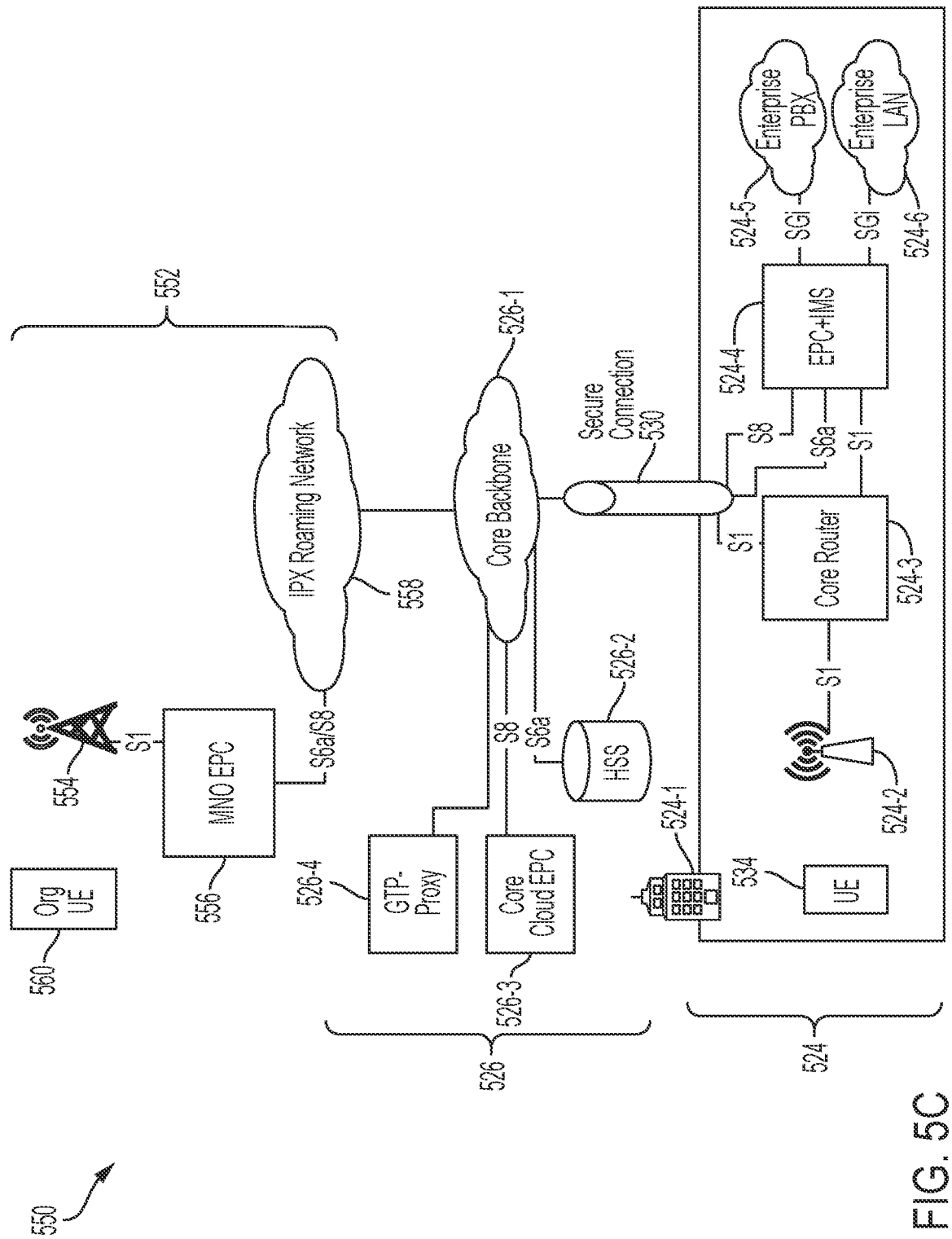
FIG. 5C illustrates an example configuration of a user equipment seamlessly functioning as an extension of a corresponding PBX device on its home site component when roaming on a public cellular network, according to an aspect of the present disclosure.

FIGS. 5A-C describe three difference non-limiting configurations of a PBX system (e.g., enterprise PBX 315) integrated with a private cellular network and how in each instance a connected endpoint (e.g., a UE such as one of UEs 309, 310, or 311) can reach their respective home PBX system and seamlessly function as an extension of a respective PBX device on their home PBX system.

FIG. 5A illustrates an example configuration of a self-contained edge private cellular network integrated with a PBX system, according to an aspect of the present disclosure. In example of FIG. 5A, the entire private cellular network is contained at a given location and is formed of only a site component such as site component 302. For example, an organization with a single location may deploy a private cellular network at its only location with various organization devices registered to use the private cellular network. In this instance, the entire private cellular network and various functionalities thereof described above with reference to FIG. 3 are contained within the edge EPC+IMS 312. Furthermore, the private cellular network of example of FIG. 5A does not have an edge core router such as the edge core router 308 of FIG. 3.

In configuration 500 of FIG. 5A, private cellular network (site component) 502 may be deployed at a physical location such as building 504. Private cellular network 502 may have access point 506 that may be the same as access point 306 of FIG. 3 and hence will not be described further. Private cellular network 502 may further include an edge EPC+IMS 508 that may be the same as edge EPC+IMS 312 (may similarly be referred to as edge EPC 508). Optionally, edge PEC 512 may be distributed with elements such as an HSS in a centralized data center or "cloud" environment.

Edge EPC 508 may be communicatively coupled to enterprise PBX 510 and enterprise LAN 512. Enterprise PBX 510 may be the same as enterprise PBX 315 and enterprise LAN 512 may be the same as enterprise LAN 314 of FIG. 3. Hence enterprise PBX 510 and enterprise LAN 512 will not be described further. As shown in FIG. 5A and similar to that described with reference to FIG. 3, access point 506 may be communicatively coupled to edge EPC 508 via an S1 connection, edge EPC 508 may be communicatively coupled to enterprise PBX 510 via an SGi connection, and edge EPC 508 may be communicatively coupled to enterprise LAN 512 via an SGi connection. While FIG. 5A illustrates a split SGi connection between edge EPC 508 and each of enterprise PBX 510 and enterprise LAN 512, a single SGi connection may be used for connecting edge EPC 508 to enterprise PBX 510 and enterprise LAN 512.

A UE 514 may be registered with private cellular network 502. When connected to access point 506 and hence to private cellular network 502, edge EPC 508 identifies UE 514's International Mobile Subscriber Identity (IMSI) as being registered with private cellular network 502. Edge EPC 508 establishes an IMS APN for UE 514. Thereafter, over IMS APN and SGi connection between edge EPC 508 and enterprise PBX 510, UE 514 can access enterprise PBX 510 including a corresponding PBX device (e.g., a PBX desktop phone belonging to the same user as the user of UE 514), other PBX devices on enterprise PBX 510, etc. Similarly, any PBX device on enterprise PBX 510 can connect to UE 514 as if accessing the corresponding PBX device on enterprise PBX 510 via UE 514's native dialer. This process of registering UE 514 with edge EPC 508 of private cellular network 502 and then enabling UE 514 to operate as an extension of a corresponding PBX device on enterprise PBX 510 using the native dialer of UE 514 will be described further below with reference to FIG. 6A.

FIG. 5B illustrates an example configuration of multiple private cellular networks and their respective PBX system integration, according to an aspect of the present disclosure. Example configuration 520 illustrates two private cellular networks with site components 522 and 524 connected to a cloud-based backend component 526 that may be the same as backend component 302 described above with reference to FIG. 3. Elements within each of site components 522 and 524 may be the same as those described above with reference to site component 304 of FIG. 3 and hence will not be described further.

For example, at site component 522 deployed at location 522-1, an access point 522-2 may be the same as access point 306, core router 522-3 may be the same as edge core router 308, edge EPC 522-4 may be the same as edge EPC 312, enterprise PBX 522-5 may be the same as enterprise PBX 315, and enterprise LAN 522-6 may be the same as enterprise LAN 314. Hence these components will not be described further. Additionally, the type of connections between different elements of site component 522 may be as shown in FIG. 5B and/or the same as those described above with reference to FIG. 3. Lastly, connection between site component 522 and backend component 526 may be through secure connection 528 that may be the same as VPN connection 318 of FIG. 3.

Furthermore, at site component 524 deployed at location 524-1, an access point 524-2 may be the same as access point 306, core router 524-3 may be the same as edge core router 308, edge EPC 524-4 may be the same as edge EPC 312, enterprise PBX 524-5 may be the same as enterprise PBX 315, and enterprise LAN 524-6 may be the same as enterprise LAN 314. Hence these components will not be described further. Additionally, the type of connections between different elements of site component 524 may be as shown in FIG. 5B and/or the same as those described above with reference to FIG. 3. Lastly, connection between site component 522 and backend component 526 may be through secure connection 530 that may be the same as VPN connection 318 of FIG. 3.

Backend component 526 may be the same as backend component 302 of FIG. 3. Elements of backend component 526 of FIG. 5B may be the same as those described above with reference to FIG. 3 even though FIG. 5B shows fewer elements associated with backend component 526 compared to backend component 302.

At backend component 526, core backbone 526-1 may be the same as core backbone 320 of FIG. 3 and HSS 526-2 may be the same as HSS 322 of FIG. 3. One difference between backend component 526 and backend component 302 is that instead of a single cloud EPC 324 that incorporates a GTP-Proxy and its functionalities as described above, backend component 526 includes cloud EPC 526-3 and a standalone GTP-proxy 526-4.

Site components 522 and 524 may be different site locations (e.g., different offices of the same organization in different cities) associated with the same private cellular network service or may each be associated with a different private cellular network service offered by different providers.

UE 530 may be associated with the private cellular network at site component 522 (site component 522 may be the "home" site for UE 530). UE 532 may be associated with the private cellular network at site component 524 (site component 524 may be the "home" site for UE 532).

Each of site components 522 and 524 have a corresponding enterprise PBX system integrated therewith. In this use case UEs 530 and 532 can utilize each of site components 522 or 526 to reach their "HOME" edge EPC and ultimately their "home" enterprise PBX For example, UE 530 for which edge EPC 522-4 is the "home" edge EPC can connect to site component 524 and reach its "home" edge EPC 522-4 and ultimately to enterprise PBX 522-5 to seamlessly connect to and function as an extension of a corresponding PBX device on enterprise PBX 522-5 using native dialer of UE 530. Similarly, UE 532 for which edge EPC 524-4 is the "home" edge EPC can connect to site component 522 and reach its "home" edge EPC 524-4 and ultimately to enterprise PBX 524-5 to seamlessly connect to and function as an extension of a corresponding PBX device on enterprise PBX 524-5 using native dialer of UE 532. This process will be described in detail with reference to FIG. 6A.

FIG. 5C illustrates an example configuration of a user equipment seamlessly functioning as an extension of a corresponding PBX device on its home site component when roaming on a public cellular network, according to an aspect of the present disclosure. The same reference number is used for any element in FIG. 5C that is the same as in FIG. 5B. Hence these elements will not be described further.

The difference between the configuration of FIG. 5C and FIG. 5B is that a UE such as UE 534 may connect to a public MNO such as MNO 552. MNO 552 may be the same as any one of MNOs 102 of FIG. 1 having components such as MNO EPC 328, MNO MMS 330, etc. Access point 554 of MNO 552 may be the same as access point 307 of FIG. 3 and can be any type of base station for a 4G/LTE and/or a 5G radio of a 5G network. MNO EPC 556 may be the same as any one of MNO EPCs 328 and hence will not be described further. Public MNO 552 may be communicatively coupled to backend component 526 via an IPX roaming network 558.

Similar to UE 534, UE 560 may also be associated (registered) with private cellular network 524. However, UE 560 may happen to be connected to public MNO 552 via access point 554. As will be described in detail with reference to FIG. 6B, UE 560 can seamlessly connect to enterprise PBX 524-5 and function as an extension of a corresponding PBX device thereon, using the native dialer of UE 560.

In configuration 550, private cellular network at site component 524 may or may not have core router 524-3. If not, site component 524 may be similar to site component 502 of FIG. 5A.

UEs 514, 532, 534, and/or 560 described above with reference to FIGS. 5A-C, may be the same as any one of UEs 309, 310, 311 or more generally the same any type of UE defined and described above with reference to FIGS. 1-3.

Various example systems of a private cellular network and configurations of a PBX system integration therewith are described above with reference to FIGS. 1-5A-5C. The disclosure next describes example methods of enabling a UE to use its native dialer and function as an extension of a corresponding PBX device when the UE is connected to a private cellular network and/or a public MNO.

Figure 6A:
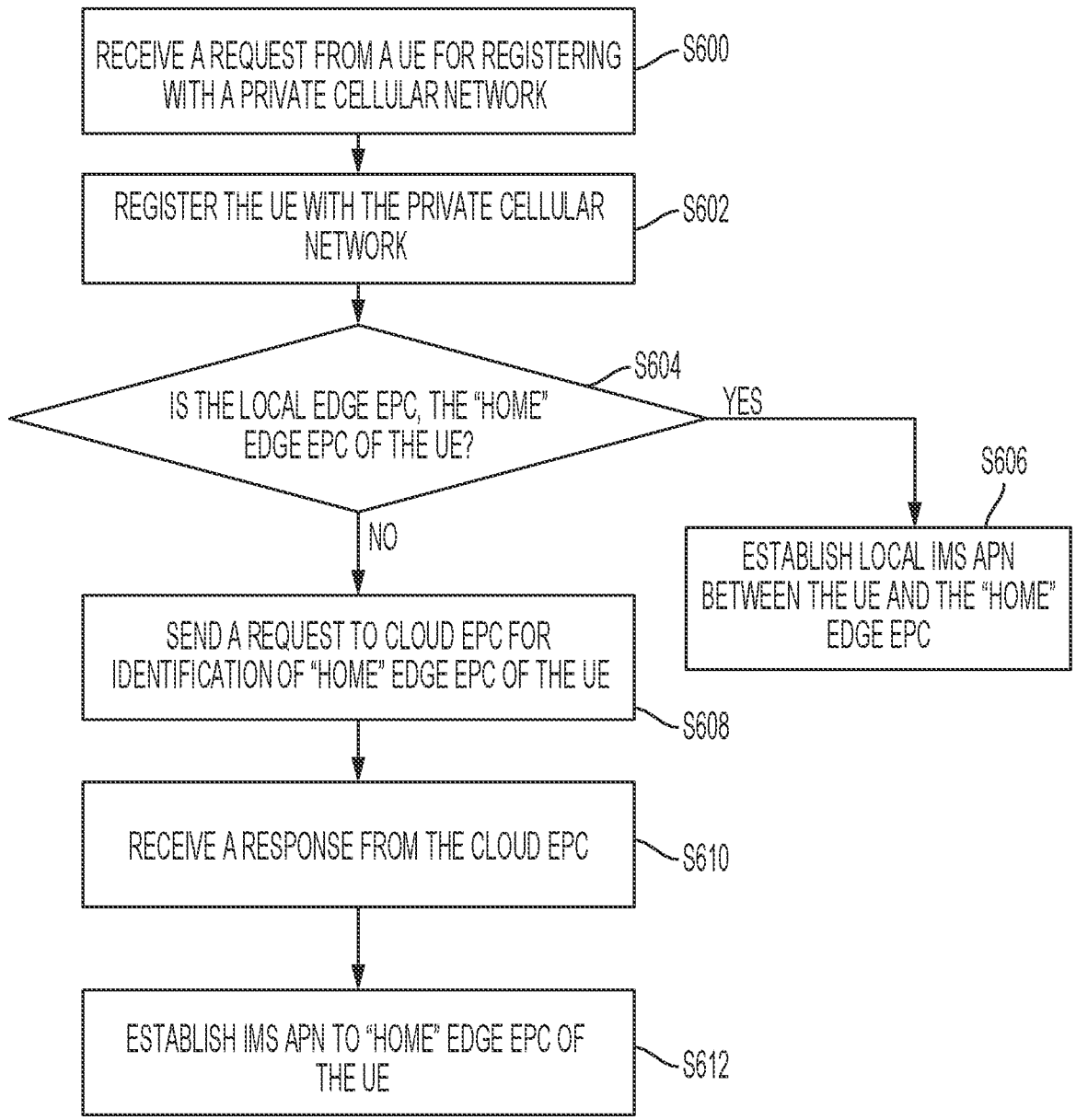
FIG. 6A illustrates an example method of allowing use of native dialer of a device on a private cellular network to access PBX connected devices, according to an aspect of the present disclosure.

FIG. 6A illustrates an example method of allowing use of native dialer of a device on a private cellular network to access PBX connected devices, according to an aspect of the present disclosure. Process of FIG. 6A will be described with reference to FIG. 3 and from perspective of edge core router 308 of FIG. 3. However, the process of FIG. 6A can equally be described with reference to FIG. 5B and from the perspective of edge core router 522-3 and/or edge core router 424-3 of FIG. 5B. In describing FIG. 6B, references may be made to FIGS. 3 to 5A-C. However, it should be understood that edge core router 308 may be executed on a server having one or more memories storing computer-readable instructions, which when executed by one or more processors, cause the one or more processors to perform the steps of FIG. 6A.

At S600, edge core router 308 receives a request from UE 309, UE 310 and/or UE 311 described above with reference to FIG. 3, for connecting to site component 304. In examples where the process of FIG. 6A is being performed by edge core router 522-3 or edge core router 424-3 of FIG. 5B, the UE can be any one of UEs 532 and/or 534 as described above with reference to FIG. 5B. This may also be referred to as a request for registering with a private cellular network offered at site component 304. In one example, site component 304 may be the local network for UE 310 from which the request is received. Therefore, edge core router 308 and edge EPC+IMS 312 may be referred to as local (home) edge core router and local (home) edge EPC+IMS for UE 310, respectively. UE 310 may also be associated with a user having at least one PBX device (e.g., one of PBX devices 404, 406 and 408, per FIG. 4) on enterprise PBX 315 that is locally connected to edge EPC 312.

In another example, UE 309 may be a roaming device connected to private cellular network at site component 304. However, edge core router and edge EPC of UE 309 may be different than edge core router 308 and edge EPC 312 of FIG. 3. Accordingly, enterprise PBX and PBX devices thereon that UE 309 may attempt to access, are communicatively coupled to UE 309's local edge EPC that is different than edge EPC 312.

As will be described below, both the roaming UE 309 and "home" or "local" UE 310, when connected to site component 304, can utilize their native dialer to seamlessly connect to and function as an extension of their respective enterprise PBX network and devices thereon.

At S602, edge core router 308 registers the UE from which the request is received at S600, with the private cellular network, according to any known or to be developed registration process for registering mobile devices with a private 4G/LTE and/or 5G network.

At S604 and as part of the registration process, edge core router 308 determines if the local edge EPC 312 is the "home" edge EPC associated with the UE being registered (e.g., such as UE 310 in the example above). In one example, the site component 304 may be deployed at a location of an enterprise entity (e.g., the Denver office of the enterprise entity) that is a customer of the private cellular network provider. The location may have a number of employees, each of which may have a device (a UE). Each UE may then be registered (e.g., using the International Mobile Subscriber Identity (IMSI) of that UE) as being associated with the location at which the site component 304 is deployed or with any other site component of the private cellular network at other locations (each of which may have a corresponding edge core router and edge EPC similar to edge core router 308 and edge EPC 312). A UE's IMSI may be referred to as the unique identifier of the UE. Accordingly, the edge core router 308 and the edge EPC 312 may be referred to as the "home" core router or "home" edge EPC of any of the devices registered for that location of the enterprise entity (e.g., the Denver office in this example).

In one example, edge core router 308 determines that the local edge EPC 312 is the "home" edge EPC of the UE being registered by comparing the IMSI of the UE with a lookup table (or routing table) at the edge core router 308 that includes all IMSIs for which edge EPC 312 serves as the "home" edge EPC.

At S606 and upon determining that edge EPC 312 is the "home" edge EPC of the UE being registered, edge core router 308 establishes an IMS APN for the registered UE (this may be referred to as a local IMS APN). The IMS APN connection may be established according to any known or to be developed method as, for example, defined by the $3^{rd}$ Generation Partnership Project (3GPP) standards. The IMS APN may be established between the registered UE and the local IMS that is part of the edge EPC 312 as shown in FIG. 3. This IMS APN may then be used to connect the registered UE to one or more PBX devices on enterprise PBX 315 that is associated with the user of the registered UE (e.g., the office phone of the employee associated with the registered UE).

Upon establishing the IMS APN, a connection between edge EPC 312 (or more specifically local IMS that is part of the local edge EPC 312) and enterprise PBX 315 may be established (e.g., a Session Initiation Protocol (SIP) connection) that allows for initiating, maintaining, and terminating real-time sessions for voice, video, and messaging applications (VoIP applications). This SIP connection can enable the registered UE to seamlessly access a corresponding PBX device on enterprise PBX 315 using a native dialer of the registered UE, and function as an extension of the PBX device without the need for installing any additional application or software on the registered UE. When operating as an extension of the PBX device, a command used on the UE for connecting to the same PBX device of which the UE is now an extension (e.g., for checking voicemail) or for connecting to any other PBX device on the enterprise PBX network 315, is the same as a command that would be used on the actual PBX device when the user uses the actual PBX device and not the UE. In some examples, connection to other PBX devices may be made to UEs similar to the UE here, when such UEs function as respective extensions of the other PBX devices.

Referring back to S604, edge core router 308 may determine that the local edge EPC 312 is not the "home" edge EPC associated with the UE being registered (e.g., the UE is a roaming such as UE 309 in the example above). In one example, edge core router 308 determines that the local edge EPC 312 is not the "home" edge EPC for the UE being registered if the IMSI of the UE is not in the local routing table of the edge core router 308.

When edge core router 308 determines that the local edge EPC 312 is not the "home" edge EPC associated with the UE being registered, then at S608, edge core router 308 sends a request to cloud EPC 324 at cloud component 302 (or alternatively a GTP proxy server if the GTP proxy is provided as a standalone server at the backend component 302 and not as part of cloud EPC 324). The request can be for identification of the "home" edge EPC of the registered UE (e.g., the roaming UE 309). For example, roaming UE 309 may be associated with an employee at another location of the enterprise entity (e.g., the New York office of the enterprise entity described above but visiting the Denver office and hence connecting to site component 304). In this example, edge core router 308 requests that cloud EPC 324 identify the "home" edge EPC for UE 309 (e.g., the corresponding edge EPC at the New York office). In one example, cloud EPC 324 may have a routing table that identifies association between a UE IMSI and its corresponding "home" edge EPC.

At S610, edge core router 308, receives a response from cloud EPC 324 identifying a "home" edge EPC for the UE (e.g., UE 309).

At S612, edge core router 308, via cloud EPC 324, establishes an IMS APN for the registered UE (e.g., UE 309) to "home" edge EPC of the registered UE. The IMS APN may be established according to any known or to be developed method specified by the 3GPP standards. Thereafter and similar to the process described above, the local edge EPC of the registered UE establishes a SIP connection to the corresponding enterprise PBX connected to the local edge EPC of the registered UE, allowing the registered UE to seamlessly access a corresponding PBX device on its local enterprise PBX using a native dialer of the registered UE, and function as an extension of the corresponding PBX device without the need for installing any additional application or software on the registered UE.

The process of FIG. 6A is described for examples of a connected UE (e.g., UE 309 or UE 310) attempting to reach or access a corresponding PBX device on its home enterprise PBX system or other PBX devices on its home enterprise PBX system. However, such communication is bi-directional. For example, a connection from a PBX device can be initiated to the connected UE over the same IMS APN connection established above (e.g., from PBX device to local edge EPC and then over the IMS APN to the connected UE).

The seamless connectivity between the UE and the corresponding enterprise PBX system is maintained via the IMS APN until the IMS APN is no longer active (e.g., when the UE disconnects from the private cellular network, activates airplane mode, etc.). After the IMS APN is taken down and upon the UE attempting to re-connect to the private cellular network, the process of FIG. 6A may be repeated.

While the process of FIG. 6A is described form the perspective of edge core router 308 of FIG. 3, the same process can be performed by metro core router 124 of FIG. 1, where metro EPC 126 may be communicatively coupled to a PBX system installed at sites 116 and/or 118. Additionally, the process of FIG. 6A can also be performed from the perspective of edge EPC 312. For example, a configuration of a private cellular network without an edge core router is described with reference to FIG. 5A. In the context of configuration 500 of FIG. 5A, the process of FIG. 6A, when performed by edge EPC 508, may only include steps S600, S602, and S606. In other words, in the context of configuration 500, it is always the case that the UE being registered is a UE for which edge EPC 508 is a "home" edge EPC.

FIG. 6A has been described with reference to examples where a UE subscribed to services of a private cellular network provider connects either to its home site component of the private cellular network or roams on another site component of the private cellular network (either another site component of a different private cellular network or at another branch/location of the same private cellular network). In either case and using the edge core router 308 (when connecting to its home site component) or a combination of the edge core router 308 and the cloud EPC 324 (when roaming on a different site component), an IMS APN is established between the UE and its home edge EPC. This is then followed by a SIP connection to its enterprise PBX, allowing the UE to seamlessly connect to the corresponding enterprise PBX network, connect with various PBX devices on the PBX network, and/or function as an extension of a corresponding PBX device on the PBX network without a need for installing any additional software or application.

In another instance, a UE subscribed to services of a private cellular network may not be connecting to any private cellular network but instead may be connecting to a public MNO (e.g., one of MNO EPCs 328). This configuration is described above with reference to FIG. 5C.

Figure 6B:
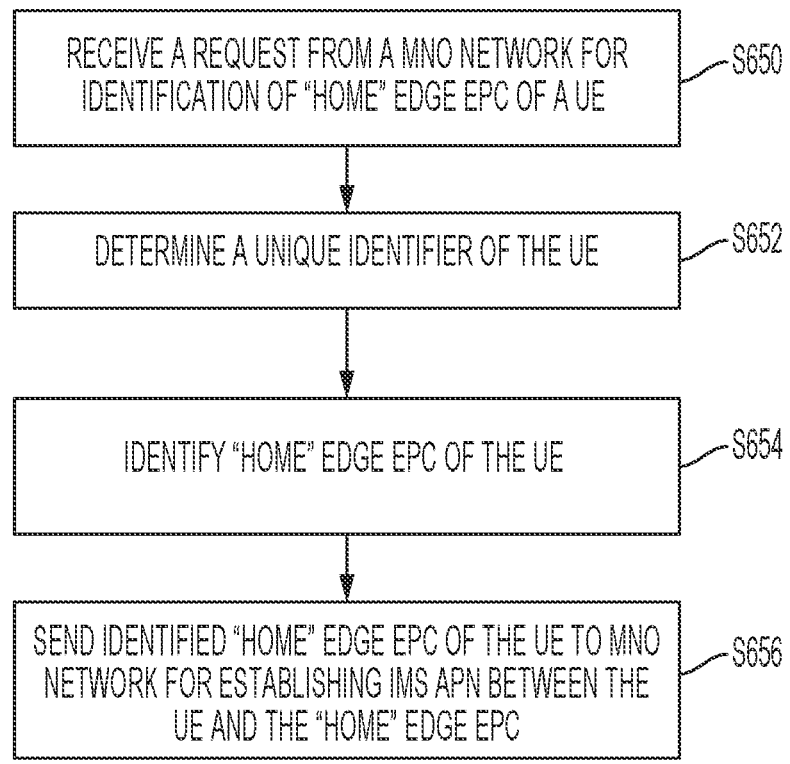
FIG. 6B illustrates an example method of allowing use of native dialer of a device connected to a network of a mobile network operator to access PBX connected devices on a private cellular network, according to an aspect of the present disclosure.

FIG. 6B illustrates an example method of allowing use of native dialer of a device connected to a network of a mobile network operator to access PBX connected devices on a private cellular network, according to an aspect of the present disclosure. Process of FIG. 6B will be described from perspective of cloud EPC 324 of FIG. 3 (or alternatively a standalone GTP server/proxy if not part of the cloud EPC 324). The process of FIG. 6B can also be described with reference to FIG. 5C and from the perspective of GTP-proxy 526-4. In describing FIG. 6B, references may be made to FIGS. 3 through 5A-C. However, it should be understood that cloud EPC 324 may be executed on a server having one or more memories storing computer-readable instructions, which when executed by one or more processors, cause the one or more processors to perform the steps of FIG. 6A.

Initially, when a UE such as the UE 309, 310, 311, or UE 560 registers with (attaches to) public MNO (e.g., public MNO 552), MNO EPC 556 of the public MNO 552 identifies the Public Land Mobile Network (PLMN) for the UE (e.g., UE 560) and sends a request to Home HSS (e.g., HSS 526-2) to validate the UE. Traffic traverses standard IPX network 558 to establish roaming traffic and HSS 526-2 validates the UE 560 according to any known or to be developed method.

As noted above, the process of FIG. 6B can be described with reference to FIG. 5C instead of or in addition to FIG. 3. If described from the perspective of FIG. 5C, cloud EPC 324 can be replaced with GTP-proxy 526-4, MNO EPC 328 can be replaced with MNO EPC 556, UE(s) 309, 310, 311 can be replaced with UE 560, edge EPC 312 can be replaced with edge EPC 524-4, enterprise PBX 315 can be replaced with enterprise PBX 524-5, etc.

At S650, cloud EPC 324 receives a request from a MNO network (e.g., from one of MNO EPCs 328). Similar to the process of FIG. 6A and as part of registering a UE with the MNO, MNO EPC 328 sends a request to cloud EPC 324 requesting identification of "home" edge EPC of a UE being registered by MNO EPC 328 for connecting to the corresponding MNO. This UE can be the same as one of UEs 309, 310, or 311 or may be different. As an example, UE 310 with "home" edge EPC 312, may be attempting to connect to MNO EPC 328.

At S652, cloud EPC 324 determines a unique identifier (e.g., IMSI) of the UE for which the request is received (e.g., UE 310). In one example, the UE's IMSI is provided to core EPC 324 by MNO EPC 328 as part of the request. This step may be the same as S602 of FIG. 6A.

At S654, cloud EPC 324 determines the "home" edge EPC for the UE using the IMSI of the UE and a lookup table (routing table), which as described above, may include association between registered UEs' IMSIs and their corresponding "home" edge EPCs. For the non-limiting example above, cloud EPC 324 identifies edge EPC 312 as the "home" edge EPC for UE 310.

At S656, cloud EPC 324 sends the identified "home" edge EPC of the UE to MNO network (e.g., MNO EPC 328). In response, MNO EPC 328 established an IMS APN for the UE to its "home" edge EPC (e.g., an IMS APN between UE 310 and edge EPC 312). The IMS APN may be established according to any known or to be developed method specified by the 3GPP standards. Thereafter and similar to the process described above, the local edge EPC of the registered UE establishes a SIP connection to the corresponding enterprise PBX connected to the local edge EPC of the registered UE, allowing the registered UE to seamlessly access a corresponding PBX device on its local enterprise PBX using a native dialer of the registered UE, and function as an extension of the corresponding PBX device without the need for installing any additional application or software on the registered UE.

Various examples described above enable endpoint devices with cellular connectivity that are connected to a private cellular network or a public MNO, use their native dialer to connect to endpoints on a Private Branch Exchange (PBX) system (PBX devices) without having to reconfigure or download software/applications on the end devices. This connectivity enables corresponding users of such endpoint devices to have a seamless connection and access to their corresponding PBX device and/or other services and PBX devices on the PBX system, transforming each such endpoint device to function as a remote PBX device on the PBX network/system. Additionally, the connectivity between endpoint devices connected to a private cellular network and their respective PBX system is through an IP Multimedia System (IMS) Access Point Name (APN) configuration, as described above, which results in the exchanged data and network traffic to receive a higher quality of service compared to other types of network traffic such as data APN.

With examples of a private cellular network and a PBX system described with reference to FIGS. 1-6 to allow remote devices connected to the private cellular network access to their respective devices and/or communicate with other devices on the PBX system using native dialer of such remote devices, the disclosure now turns to description of several example system components and architectures that can be utilized to function as any one or more components of ecosystems described above such as edge core router 308, metro core router 124, etc.

Figure 7A:
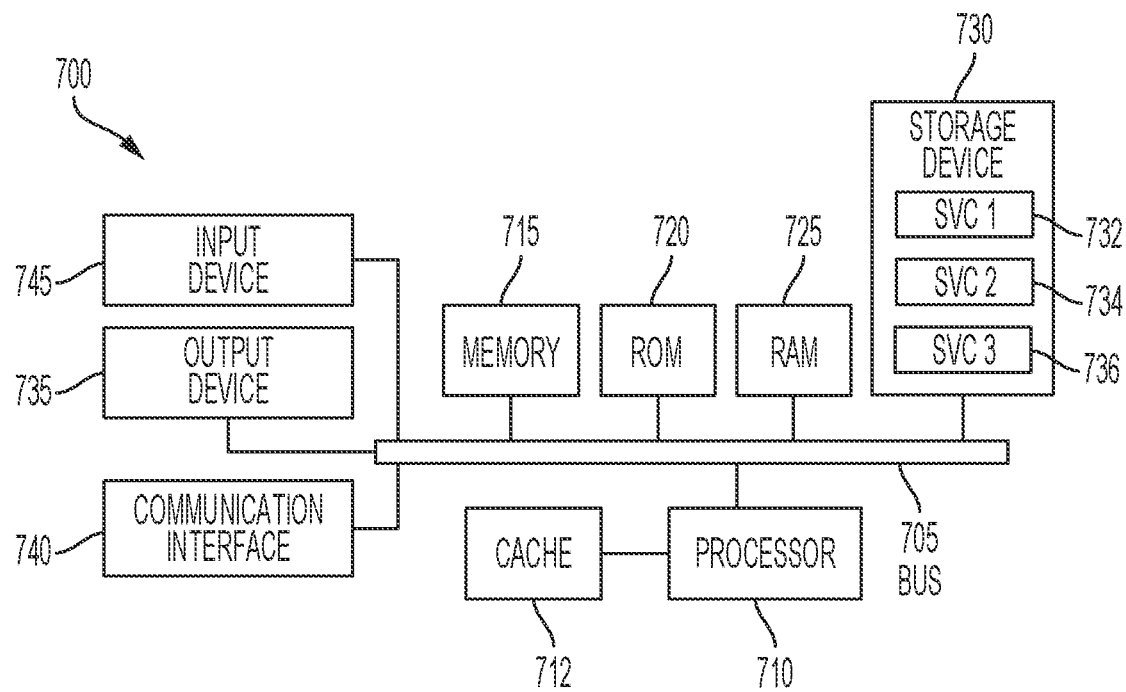
FIGS. 7A and 7B illustrate systems according to an aspect of the present disclosure.
Figure 7B:
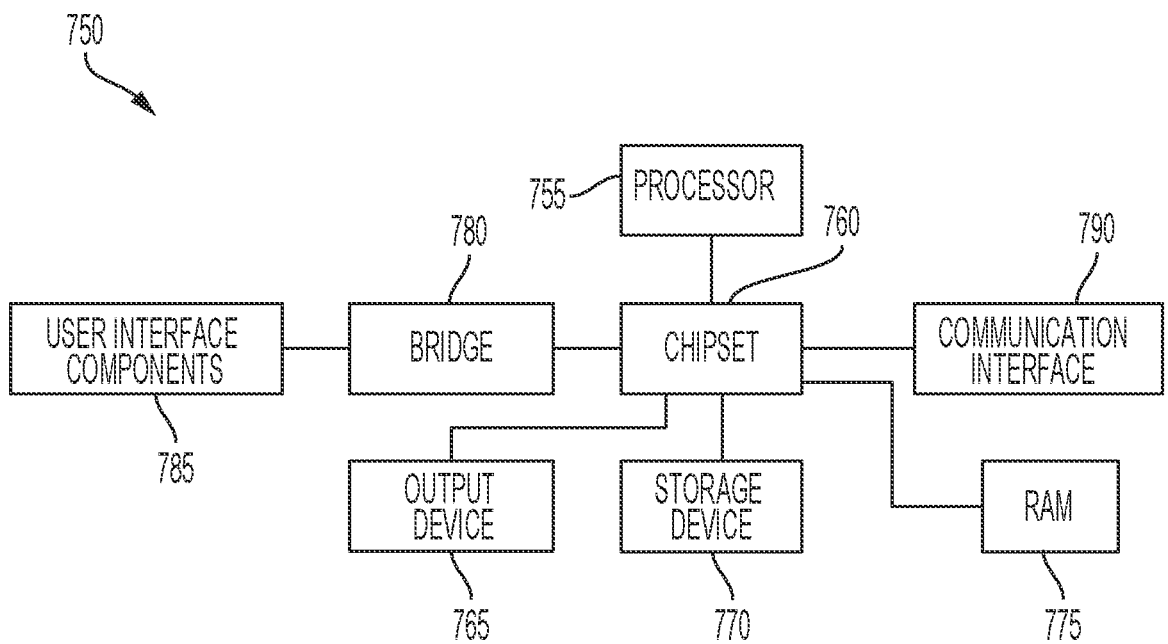

FIGS. 7A and 7B illustrate systems according to an aspect of the present disclosure. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as services (SVC) 1 732, SVC 2 734, and SVC 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software SVCs 732, 734, and 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A router associated with a private cellular network, the router comprising:
   at least one memory having computer-readable instructions stored therein; and
   one or more processors configured to execute the computer-readable instructions to:
   receive, from a user equipment, a request to register with the private cellular network, the user equipment having a unique identifier;
   determine, at the router or via cloud-based Evolved Packet Core (EPC) communicatively coupled to the router, a home EPC associated with the user equipment using the unique identifier of the user equipment; and
   establish an IP Multimedia Service (IMS) Access Point Name (APN) connection between the user equipment and the home EPC associated with the user equipment, the IMS APN enabling a seamless connectivity of the user equipment to a terminal on a Private Branch Exchange (PBX) system using a native dialer of the user equipment, wherein a command provided on the user equipment for connecting to the terminal on the PBX system is the same as a command to be provided on a PBX device within the PBX system for establishing a connection to the terminal.

2. The router of claim 1, wherein the user equipment does not have an application installed thereon and configured for facilitating connections to the PBX system.

3. The router of claim 1, wherein the connection request is one of a request to establish a voice communication with the terminal on the PBX system, a request to access a voicemail on the terminal on the PBX system, a request for establishing a multimedia session with the terminal on the PBX system, or a request from a PBX device for communicating with the user equipment.

4. The router of claim 1, wherein a PBX server of the PBX system is communicatively coupled to the home EPC of the user equipment.

5. The router of claim 1, wherein the router is configured to identify an edge EPC that is local to the router and communicatively coupled thereto, as the home EPC of the user equipment, if the unique identifier of the user equipment is available at a local routing table of the router.

6. The router of claim 5, wherein when the router determines that the unique identifier of the user equipment is not available in the local routing table of the router, the router is configured to send a message to the cloud EPC requesting identification of the home EPC of user equipment.

7. The router of claim 6, wherein the home EPC identified by the cloud EPC is not at a same physical location as the router.

8. The router of claim 6, wherein the cloud EPC identifies the home EPC using the unique identifier of the user equipment and a corresponding routing table available at the cloud EPC.

9. The router of claim 1, wherein the user equipment and the terminal on the PBX system are associated with a same user.

10. A system for a private cellular network comprising:
a cloud-based evolved packet core (EPC); and
a router communicatively coupled to the cloud-based EPC, the router including at least one memory having computer-readable instructions stored therein and one or more processors configured to execute the computer-readable instructions to:
  receive, from a user equipment, a request to register with the private cellular network, the user equipment having a unique identifier;
  determine, at the router or via the cloud-based EPC, a home EPC associated with the user equipment using the unique identifier of the user equipment; and
  establish an IP Multimedia Service (IMS) Access Point Name (APN) connection between the user equipment and the home EPC associated with the user equipment, the IMS APN enabling a seamless connectivity of the user equipment to a terminal on a Private Branch Exchange (PBX) system using a native dialer of the user equipment, wherein a command provided on the user equipment for connecting to the terminal on the PBX system is the same as a command to be provided on a PBX device within the PBX system for establishing a connection to the terminal.

11. The system of claim 10, wherein the user equipment does not have an application installed thereon and configured for facilitating connections to the PBX system.

12. The system of claim 10, wherein the connection request is a request to establish a voice communication with the terminal on the PBX system or a request from a PBX device for communicating with the user equipment.

13. The system of claim 10, wherein the connection request is a request to access a voicemail on the home EPC of the user equipment.

14. The system of claim 10, wherein the router is configured to identify an edge EPC that is local to the router and communicatively coupled thereto, as the home EPC of the user equipment, if the unique identifier of the user equipment is available at a local routing table of the router.

15. The system of claim 14, wherein when the router determines that the unique identifier of the user equipment is not available in the local routing table of the router, the router is configured to send a message to the cloud EPC requesting identification of the home EPC of user equipment.

16. The system of claim 15, wherein the home EPC identified by the cloud EPC is not at a same physical location as the router.

17. The system of claim 15, wherein the cloud EPC identifies the home EPC using the unique identifier of the user equipment and a corresponding routing table available at the cloud EPC.

18. The system of claim 10, wherein the user equipment has a SIM card registered with the private cellular network.

* * * * *